United States Patent [19]

Batten et al.

[11] 3,773,536
[45] Nov. 20, 1973

[54] PRODUCTION OF PIGMENTS

[75] Inventors: Samuel Veale Batten, Billingham; Sydney John Gill, Yarm; David Graeme Milne, Middlesbrough, all of England

[73] Assignee: British Titan Limited, Billingham, Teesside, England

[22] Filed: Apr. 13, 1972

[21] Appl. No.: 243,872

[30] Foreign Application Priority Data

May 4, 1971 Great Britain................... 13,076/71

[52] U.S. Cl............... 106/309, 106/300, 106/308 Q
[51] Int. Cl............................................. B09c 3/00
[58] Field of Search................. 106/300, 308 Q, 309

[56] References Cited
UNITED STATES PATENTS 3,645,765   2/1972   Frazier et al..................... 106/308 Q
3,674,736   7/1972   Lerman et al. ................. 106/308 Q

FOREIGN PATENTS OR APPLICATIONS 774,944     5/1957    Great Britain
795,263     5/1958    Great Britain
802,953    10/1958    Great Britain
1,056,994   2/1967    Great Britain
1,110,193   4/1968    Great Britain Primary Examiner—Curtis R. Davis
Attorney—Schuyler et al.

[57]  ABSTRACT

A process for the production of pigment in the form of pellets by mixing the pigment under conditions of low shear and in the substantial absence of water with a hydrophobic organic liquid and then separating and collecting the so-formed pellets.

16 Claims, No Drawings

PRODUCTION OF PIGMENTS

This invention relates to the production of pigments in a form that permits easy handling whilst retaining easy dispersibility in liquid media.

According to the present invention, a process for the production of pelletised pigment comprises mixing under conditions of low shear and in the substantial absence of water, a pigment in powdered form and a hydrophobic organic liquid until pellets are formed and separating the collecting said pellets.

The process of the present invention is a simple but effective way of pelletising a powdered pigment, particularly inorganic pigments. Typical pigments which may be pelletised are inorganic pigments such as alumina, zirconia, iron oxide, magnesium carbonate, zinc oxide, titanium dioxide, barium sulphate, metal titanates, talc, carbon black and clays. In order to operate the process of the invention most satisfactorily the pigment should have a hydrophilic surface as opposed to a hydrophobic surface. Most inorganic pigments in their usual form are hydrophilic although it is general in the production of, particularly, titanium dioxide to coat the surface with one or more hydrous oxides of, say, aluminium, zirconium, cerium, titanium and silicon and such coated pigments retain their hydrophilic nature, and indeed this property may even be increased. Organic coatings of pentaerythritol or triethanolamine can be applied.

The hydrophobic organic liquid, i.e., an organic liquid substantially immiscible with water is one which does not wet the surface of the pigment to an appreciable extent. Preferably the liquid is an aliphatic organic liquid and may be a hydrocarbon such as a straight or branched chain aliphatic hydrocarbon liquid or a cycloaliphatic hydrocarbon. Typical hydrocarbons are hexane, heptane, nonane or cyclohexane or petroleum spirit. The organic liquid should preferably be volatile at a relatively low temperature to facilitate its removal and should also preferably be noninflammable. A particularly preferred hydrophobic organic liquid is a halogenated hydrocarbon containing at least one fluorine atom. Typically, the halogenated hydrocarbon can contain up to four carbon atoms but the choice depends on the desired boiling point of the liquid which should be greater than ambient temperature. These compounds have a low level of toxicity, excellent thermal and chemical stability, high denisity coupled with a low boiling point and low viscosity and surface tension and are non-inflammable. Typical examples of these halogenated hydrocarbons have the formulae $CCl_3F$, $CBrF_2-CBrF_2$, $CCl_2F-CClF_2$ and $CCl_2F-Cl_2F$.

Surprisingly, it has been found that pelletisation occurs when the hydrophobic liquid is present in a considerable amount. If the pigment/hydrophobic organic liquid on mixing is in the form of a slurry then the concentration of the pigment in the slurry on a weight to weight basis should be at least one percent. More usually, the concentration of the pigment is at least 10 percent by weight of the slurry but preferably the concentration is in excess of 20 percent, say 25 percent, by weight of the slurry. If desired, higher concentrations of up to 50 percent and above of pigment by weight of the slurry may be used.

The pigment and the hydrophobic organic liquid are mixed under conditions of low shear to facilitate the formation of the pellets. One convenient manner of effecting the pelletisation is to carry out the mixing in a cylindrical mixer which is trundled or otherwise rotated about its longitudinal axis. When such a mixing vessel is used the requisite low shear is obtained by avoiding the use of any internal high speed agitator or stirrer. It has also been found that the total amount of the pigment and hydrophobic organic liquid present in the mixing vessel is important in effecting efficient pelletisation but this also depends on the concentration of the pigment in the pigment/hydrophobic organic liquid slurry. For instance, with slurries containing from about 5 to 15 percent of pigment by weight, the volume of slurry in the mixing vessel should be at least 40 percent of the total volume of the vessel, for slurries containing 15 to 20 percent of pigment by weight, the volume of slurry in the vessel should be at least 30 percent of the volume of the vessel and for slurries containing greater than 20 percent by weight of the pigment, the volume of slurry in the vessel should be at least 10 percent of the volume of the vessel. Preferably, the concentration of the pigment in the slurry is about 25 percent and the volume of slurry in the vessel is from 50 percent to 70 percent of the volume of the vessel.

Any other suitable type of mixing vessel may be used provided that the necessary low shear mixing is performed. For example, the mixing may take place within a pipe which is used to transport the pigment and which pipe can either be rotated by external means or which can be fitted with an internal helically threaded shaft member which is rotated slowly to impart the necessary low shear mixing to the slurry and additionally to effect the transportation of the slurry through the pipe.

The pelletisation process according to the invention may be operated either in a batchwise or continuous manner but in the latter mode of operation the foregoing requirements regarding concentration of the pigment in the slurry and total volume of the slurry in the mixing vessel should be adhered to.

The actual speed of rotation of the mixing vessel can be varied over a wide range of speeds but this will depend on the particular type and size of mixing vessel. For instance, with a vessel rotated by external means, it has been found that efficient pelletisation occurs when the vessel is rotated at from 50 to 150 revolutions per minute with the lower speeds of revolution being adequate for the larger diameter vessels.

The time of mixing generally is that necessary to achieve the desired production of the pellets but times of from 30 minutes to 90 minutes are usually sufficient. A convenient time is 60 minutes.

The pelletisation is effected in the substantial absence of water. Normally, the pigment will be dry prior to pelletisation and thus no special steps are taken to remove water. Although it is stated that the process is effected in the substantial absence of water, any moisture which is normally associated with the pigment is permissible.

The process produces pelletised pigment having a size normally greater than 0.5 mm. diameter. The pellets are eminently suitable for easy handling. Pelletised titanium dioxide can be used in a wide variety of paints such as oleoresinous paints having gloss or matt finishes, aqueous emulsion paints and in inks, plastics and rubbers. There is no loss in dispersibility on pelletisation or of pigmentary properties such as gloss or hiding power.

The invention is illustrated in the following Examples:

Example 1

Various rutile titanium dioxide pigments were placed in 1,180 ml. glass jars in a total amount of 300 grams together with 500 grams of hexane. The glass jars were closed and trundled at 70 revolutions per minute for various times.

At the end of the stated times, the contents of the glass jars were heated to evaporate the hexane and the product examined by sieving on British Standard sieves to determine the size of the pellets produced.

Various experiments were performed, the details of which are set out in the following Table I.

TABLE I

| Pigment | Weight, grams | Trundling time, hours | Results |
|---|---|---|---|
| 1 | 300 | 0.5 | All pelletised; none less than 0.36 mm. in diameter, some ¼ inch. |
| 1 | 300 | 5 | Do. |
| 1/2 | 285/15 | 1 | All pelletised, most greater than 0.71 mm. in diameter, some ¼ inch. |
| 1/2 | 292.5/7.5 | 1 | Do. |
| 1/2 | 297/3 | 1 | All pelletised, most greater than 0.71 mm. in diameter, some 3/16 inch. |

Pigment 1 was a rutile titanium dioxide pigment having a coating of a hydrous oxide of aluminium in an amount of 6% $Al_2O_3$ and a hydrous oxide of silicon in an amount of 10% $SiO_2$ on $TiO_2$ and pigment 2 was a rutile titanium dioxide pigment having a coating of a hydrous oxide of aluminium in an amount of 2% $Al_2O_3$ and a hydrous oxide of silicon in an amount of 1% $SiO_2$ on $TiO_2$.

The above results show quite clearly that titanium dioxide pigments having two different coatings can be pelletised by trundling in hexane for various lengths of time.

Certain of the pellets prepared were tested for their dispersibility in aqueous and oleoresinous paint media. The pelletised pigment 1 which had been trundled for 0.5 hours produced an acceptable dispersion without any large gritty particles. A similar result was obtained for the pellets prepared from the mixtures of pigment 1 and 2 containing respectively 285 grams and 15 grams and 292.5 grams and 7.5 grams. Samples of pellets obtained from the mixed titanium dioxide pigments containing 292.5 and 7.5 grams respectively of pigment 1 and 2 produced acceptable dispersions even after allowing the pigments to air dry for 5 weeks.

Example 2.

A series of slurries of pigment No. 1 in a halogenated hydrocarbon commonly known as trichlorotrifluoroethane having the formula $CCl_2FCClF_2$ (more correctly known as 1-dichlorofluoro-2-chlorodifluoroethane) were trundled in various amounts in 720 ml. jars for 1 hour. The slurries were formulated at five percent, 20 percent and 25 percent/weight pigment concentration and at various volumes of the total volume of the jar. The speed of rotation of the jars was 80 r.p.m.

The results are shown in the following Tables II, III and IV.

TABLE II.—5% SLURRIES

| Weight of pigment/solvent (grams) | Total volume of pigment/solvent (ml.) | Percent of jar volume | Comments |
|---|---|---|---|
| 30/570 | 371.2 | 51.5 | 90% pelletised; 1/16" diam. |
| 40/760 | 494.9 | 68.7 | Do. |
| 50/950 | 618.6 | 86 | 15% pelletised. |

TABLE III.—20% SLURRIES

| Weight of pigment/solvent (grams) | Total volume of pigment/solvent (ml.) | Percent of jar volume | Comments |
|---|---|---|---|
| 80/320 | 225.4 | 31.3 | 25% pelletised; 1/8" diam. |
| 120/480 | 338.1 | 46.9 | 80% pelletised; 1/8" diam. |
| 160/640 | 450.8 | 62.6 | 50% pelletised; up to ¼" diam. |
| 200/800 | 563.7 | 78.3 | Do. |

TABLE IV.—25% SLURRIES

| Weight of pigment/solvent (grams) | Total volume of pigment/solvent (ml.) | Percent of jar volume | Comments |
|---|---|---|---|
| 25/75 | 54.6 | 7.6 | 30% pelletised; up to 1/8" diam. |
| 50/150 | 109.0 | 15.1 | 50% pelletised; up to 1/8" diam. |
| 100/300 | 218.0 | 30.3 | 90% pelletised; up to 3/16" diam. |
| 150/450 | 327.0 | 45.4 | 100% pelletised; up to 1/8" diam. |
| 200/600 | 436.2 | 60.6 | Do. |
| 300/900 | 654.2 | 90.9 | 95% pelletised; mainly less than 1/16" diam. |

Example 3

25 percent weight/weight slurries of pigment No. 1 in trichlorotrifluoroethane were trundled in various sized glass jars with different volumes of slurries so that the volume of slurry was 0.25, 0.5 and 0.75 that of the glass jar. The speed of rotation of the trundler on which the glass jar was rotated was 75 r.p.m. in each case but since the jars were of differing diameters, the actual speeds of rotation of the jars differed. The jars were trundled for 1 hour in each case. In addition, three further experiments were carried out using glass jars having a capacity of 1,180 mls. with the speed of rotation of two of the jars being increased to 103 r.p.m. and to 131 r.p.m. for the third jar.

The results of the various experiments are given in the following Tables VA and VB.

TABLE V-A

| Experiment No. | Volume of jar (ml.) | Weight of pigment/solvent (grams) | Total volume of pigment/solvent (ml.) |
|---|---|---|---|
| 1 | 120 | 14/42 | 30 |
| 2 | 120 | 28/84 | 60 |
| 3 | 120 | 42/126 | 90 |
| 4 | 210 | 24/72 | 52.5 |
| 5 | 210 | 48/144 | 105 |
| 6 | 210 | 72/216 | 157.5 |
| 7 | 720 | 82/246 | 180 |
| 8 | 720 | 164/492 | 360 |
| 9 | 720 | 246/738 | 540 |
| 10 | 1,180 | 135/405 | 295 |
| 11 | 1,180 | 270/810 | 590 |
| 12 | 1,180 | 405/1,215 | 885 |
| 13 | 1,180 | 270/810 | 590 |
| 14 | 1,180 | 405/1,215 | 885 |
| 15 | 1,180 | 270/810 | 590 |

TABLE V-B

| Experiment No. | Speed of rotation of jar, r.p.m. | Comments |
|---|---|---|
| 1 | 125 | 80% pelletised; up to 1/8" diam. |
| 2 | 125 | 100% pelletised; up to 1/8" diam. |
| 3 | 125 | Do. |
| 4 | 102 | 20% pelletised; up to 1/8" diam. |
| 5 | 102 | 50% pelletised; up to 3/16" iiam. |
| 6 | 102 | 90% pelletised; up to 3/16" diam. |
| 7 | 80 | 20% pelletised; up to 3/16" diam. |
| 8 | 80 | 100% pelletised; up to 1/8" diam. |
| 9 | 80 | 90% pelletised; up to ¼" diam. |
| 10 | 70 | 80% pelletised; up to ¼" diam. |
| 11 | 70 | 100% pelletised; up to 3/16' diam. |
| 12 | 70 | 95% pelletised; up to 3/16" diam. |
| 13 | 103 | 100% pelletised; up to 1/8" diam. |
| 14 | 103 | 95% pelletised; up to 3/16" diam. |
| 15 | 131 | 70% pelletised; up to 3/16" diam. |

Example 4

A slurry of zinc oxide in the halogenated hydrocarbon trichloro-trifluoroethane containing zinc oxide in an amount of 25 percent w/w was placed in a glass jar having a size of 720 ml. such that the volume of slurry placed in the jar was 360 mls. The glass jar was trundled to rotate at 103 r.p.m. for 1 hour.

The mixture was removed from the jar and it was found that all the zinc oxide had formed pellets of up to 1/8 inch diameter.

Yellow iron oxide was similarly pelletised but in this case the pellets were smaller in size.

Nickel titanate was similarly pelletised and it was found that all the nickel titanate formed pellets of up to 1/8 inch diameter.

Example 5

A sample of pigment No. 2 used in Example 1 was mixed in a 720 ml. glass jar at a concentration of 25 weight per cent in trichloro-trifluoroethane. The glass jar was rotated on trundlers rotating at a speed of 110 r.p.m. for 1 hour. After separation of the liquid hydrocarbon, the pigment was found to be pelletised to 70 percent and had a size of up to 1/4 inch diameter.

A similar experiment was performed but using as the pigment non-coated anatase grade of titanium dioxide. After pelletisation, it was found that the pigment was pelletised to 70 percent and had a size of up to 1/4 inch diameter.

Example 6

A sample of carbon black was mixed in a 720 ml. glass jar at a concentration of 25 percent (w/w) in trichloro-trifluoroethane. The volume of the slurry in the jar was 50 percent of the total volume. The glass jar was rotated on trundlers rotating at a speed of 110 r.p.m. for 1 hour. After separation of the liquid hydrocarbon, the carbon black was found to be completely pelletised and had a size of up to 1/8 inch diameter.

What is claimed is:

1. A process for the production of pelletized pigment which comprises mixing in a mixing vessel under conditions of low shear and in the substantial absence of water a pigment in powdered form and an organic hydrophobic liquid hydrocarbon containing at least one fluorine atom until pellets are formed and separating and collecting said pellets.

2. A process according to claim 1 in which the pigment is an inorganic pigment having a hydrophilic surface.

3. A process according to claim 1 in which the halogenated hydrocarbon contains up to four carbon atoms having a boiling point in excess of the ambient temperature.

4. A process according to claim 1 in which the pigment forms a slurry on mixing in which the concentration of the pigment in the slurry is at least one percent on a weight to weight basis.

5. A process according to claim 4 in which the concentration of the pigment in the slurry is at least 10 percent on a weight to weight basis.

6. A process according to claim 4 in which the concentration of the pigment in the slurry is in excess of 20 percent on a weight to weight basis.

7. A process according to claim 1 in which the mixing is effected in a cylindrical mixer mounted to rotate about its longitudinal axis.

8. A process according to claim 1 in which the mixture of pigment and said organic liquid contains the pigment in an amount of between five to 15 percent by weight and the volume of the mixture is at least 40 percent of the total volume of the mixing vessel.

9. A process according to claim 1 in which the mixture of pigment and said organic liquid contains the pigment in an amount of from 15 to 20 percent by weight and the volume of the mixture is at least 30 percent of the total volume of the mixing vessel.

10. A process according to claim 1 in which the mixture of pigment and said organic liquid contains the pigment in an amount of greater than 20 percent by weight and the volume of the mixture is at least 10 percent of the total volume of the mixing vessel.

11. A process according to claim 10 in which the mixture of pigment and said organic liquid contains the pigment in an amount of about 25 percent by weight and the volume of the mixture is from 50 to 70 percent of the total volume of the mixing vessel.

12. A process according to claim 1 which the mixing is effected within a pipe which is rotated to effect the mixing.

13. A process according to claim 1 in which the mixing is effected in a pipe having an internal helically threaded shaft member which shaft member is rotatable to effect the mixing.

14. A process according to claim 7 in which the vessel is rotated at from 50 to 150 revolutions per minute.

15. A process according to claim 1 in which the mixing is carried out for a time of from 30 to 90 minutes.

16. A process according to claim 1 in which the pigment is titanium dioxide.

* * * * *